[12] United States Patent  
Knecht et al.

(10) Patent No.: US 7,484,486 B2
(45) Date of Patent: Feb. 3, 2009

(54) DRIVE FOR VALVE OPERATING CONTROL SYSTEMS IN MOTOR VEHICLES, PREFERABLY CAMSHAFT ADJUSTERS

(75) Inventors: Andreas Knecht, Kusterdingen (DE); Guido Schneider, Altenstadt (DE); Gerold Sluka, Nuertingen (DE); Wolfgang Stephan, Boll (DE)

(73) Assignee: Dr. Ing H.C.F. Porsche Aktiengesellschaft, Stuttgart (DE)

( * ) Notice: Subject to any disclaimer, the term of this patent is extended or adjusted under 35 U.S.C. 154(b) by 352 days.

(21) Appl. No.: 10/494,416

(22) PCT Filed: Feb. 8, 2003

(86) PCT No.: PCT/EP03/01262

§ 371 (c)(1),
(2), (4) Date: May 5, 2004

(87) PCT Pub. No.: WO03/076771

PCT Pub. Date: Sep. 18, 2003

(65) Prior Publication Data

US 2005/0066922 A1 Mar. 31, 2005

(30) Foreign Application Priority Data

Mar. 12, 2002 (DE) .................. 102 11 607

(51) Int. Cl.
*F01L 1/02* (2006.01)

(52) U.S. Cl. ............... 123/90.31; 123/90.17; 123/90.6; 464/160

(58) Field of Classification Search ............. 123/90.15, 123/90.16, 90.17, 90.18, 90.27, 90.31, 90.6; 464/1, 2, 160; 460/1, 2, 160
See application file for complete search history.

(56) References Cited

U.S. PATENT DOCUMENTS

| 4,789,697 | A | * | 12/1988 | Affenzeller et al. ......... 523/437 |
| 5,715,780 | A | * | 2/1998 | Haller ...................... 123/90.17 |
| 5,836,278 | A | | 11/1998 | Scheidt |
| 5,860,397 | A | | 1/1999 | Schafer |
| 5,875,750 | A | | 3/1999 | Iwasaki et al. |
| 6,386,166 | B1 | | 5/2002 | Scott et al. |
| 6,405,696 | B1 | | 6/2002 | Borraccia et al. |
| 2003/0037741 | A1 | | 2/2003 | Kohrs |

FOREIGN PATENT DOCUMENTS

| DE | 19616266 A1 | 10/1997 |
| DE | 19858205 A1 | 6/2000 |
| DE | 19961193 A1 | 6/2001 |
| DE | 10134320 A1 | 1/2003 |

* cited by examiner

*Primary Examiner*—Ching Chang
(74) *Attorney, Agent, or Firm*—RatnerPrestia

(57) ABSTRACT

A drive for valve drive operating control systems in motor vehicles, preferably for camshaft adjusters, includes at least one drive wheel and functional parts, such as a cover, a stator, a closing ring, and a sealing ring, as well as at least one rotor. The drive wheel and at least one of the functional parts are produced in a single part from a high-resistant, non-metallic material.

21 Claims, 5 Drawing Sheets

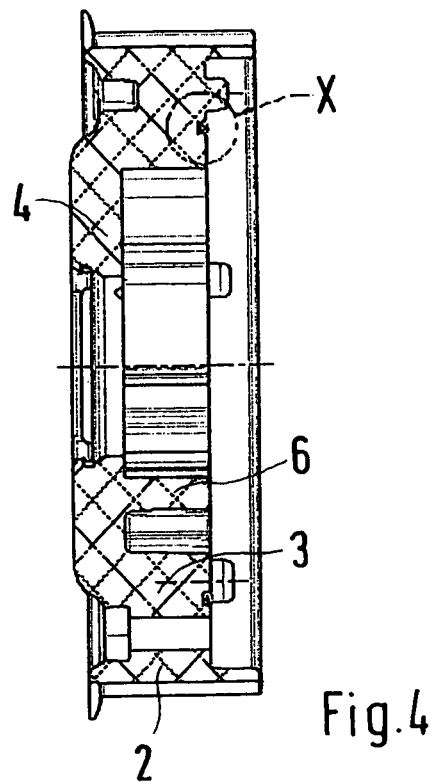
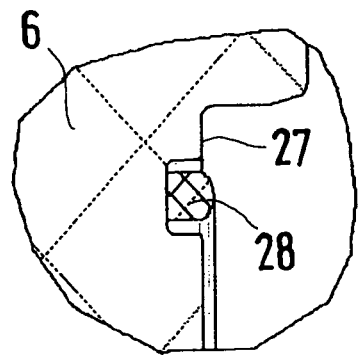
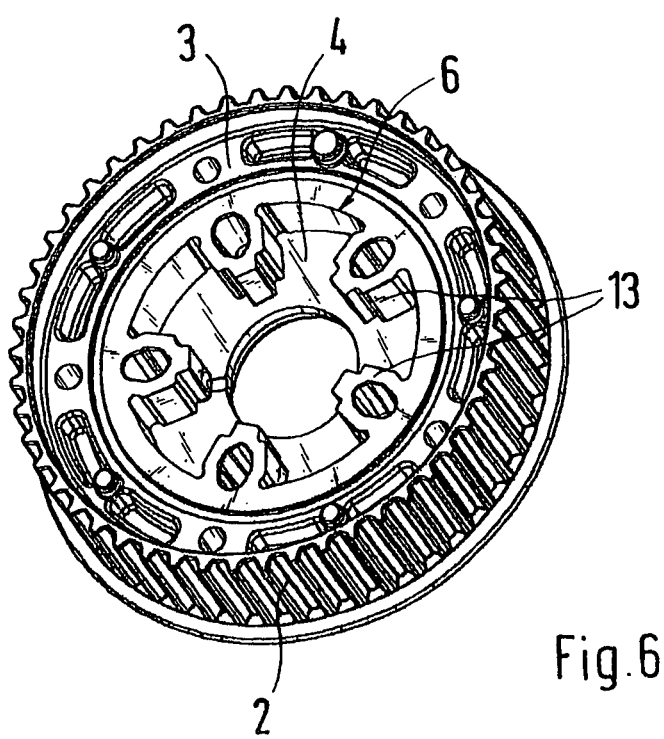

DRIVE FOR VALVE OPERATING CONTROL SYSTEMS IN MOTOR VEHICLES, PREFERABLY CAMSHAFT ADJUSTERS

BACKGROUND AND SUMMARY OF THE INVENTION

This invention describes a drive for valve drive operating control systems in motor vehicles, preferably for camshaft adjusters.

Familiar drives for valve operating control systems consist of a plurality of components, such as a drive wheel, a cover, a stator, a closing ring, a sealing ring, a rotor, and a press ring. The highly stressed parts are here made out of steel, metal alloys, or non-ferrous alloys. The production of these individual parts, as well as their assembly, is complex and expensive.

One object of the invention is to build this type of drive in a way that it can be produced and assembled inexpensively with few components.

This object is achieved in a drive pursuant to the invention.

On the invented drive, the drive wheel and at least one of the functional parts are produced in a single part from a high-resistant, non-metallic material. By the use of the high-resistant material, complicated parts can be produced inexpensively and with less energy. The number of parts is lowered, therefore decreasing not only the production costs, but also the assembly costs.

Further characteristics of the invention are described in further claims, the description, and the drawings.

With the help of some designs that are depicted in the drawings the invention is explained in more detail.

BRIEF DESCRIPTION OF THE DRAWINGS

FIG. 4 is an axial sectional view of a part of a further design of a drive according to the invention, FIG. 5 shows the detail X in FIG. 4 in an enlarged view, FIG. 6 is a diagrammatic view of a toothed belt wheel, a cover, a closing ring, and a stator of the drive according to the invention, which are designed as a single part.

DETAILED DESCRIPTION OF THE INVENTION

Figure 9:
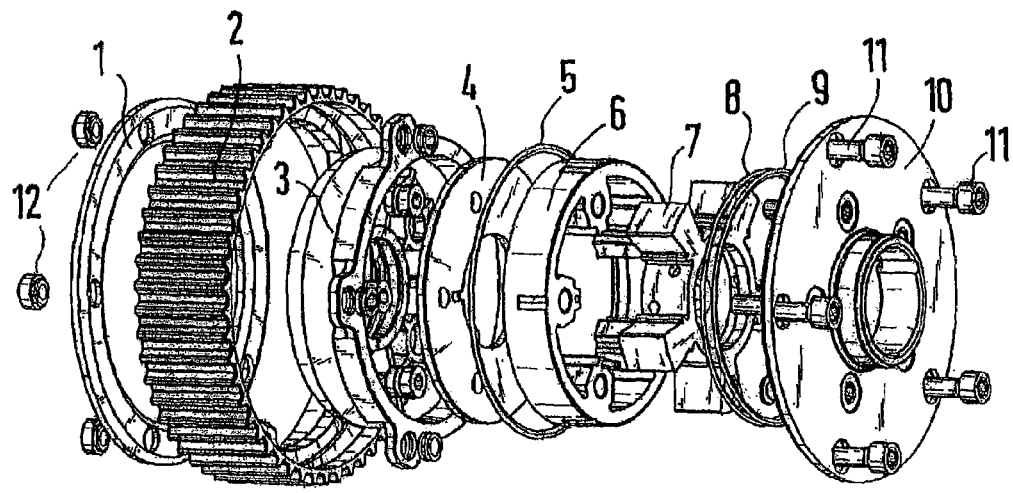
FIG. 9 is an exploded view of a known drive.

FIG. 9 shows a known oscillating motor, which is part of a camshaft adjusting system that is used in motor vehicles. This oscillating motor has a press ring 1, a toothed belt wheel/sprocket wheel 2, a hood-shaped cover 3, a flat closing ring 4, a sealing ring 5, a stator 6, a rotor 7, sealing rings 8, 9, and a wheel disk 10. These parts are assembled in a known manner and are held together with threaded bolts 11, which are arranged and distributed around the circumference of the oscillating motor and penetrate the press ring 1. The threaded bolts 11 are screwed on into nuts 12, which rest on the side of the press ring 1 facing away from the cover 3. The described parts of the oscillating motor are held together axially with the threaded bolts 11 and the nuts 12. The high-resistant parts of the oscillating motor, such as the toothed belt wheel/sprocket wheel 2, the stator 6, or the cover 3, are produced from steel, metal alloys, or from non-ferrous alloys. The production of these parts of the named materials is complex and expensive. The multitude of individual parts also complicates and increases the price of the assembly of the oscillating motor.

In order to be able to produce the parts of the oscillating motor in a cost-efficient way and with low energy requirements in the case of a small number of parts, high-resistant non-metallic materials, which contain at least one high-resistant plastic material, are used for the high-resistant or high-stressed parts of the oscillating motor. Although the material contains other components besides plastics, reference is made in the following to high-resistant plastic materials for simplicity reasons. By using such high-resistant materials, it is possible to also produce parts of the oscillating motor, such as the toothed belt wheel/sprocket wheel 2 with the stator 6, the toothed belt wheel/sprocket wheel 2 with the cover 3, the toothed belt wheel/sprocket wheel 2 with the cover 3 and the wheel disk 10, the toothed belt wheel/sprocket wheel 2 with the cover 3, the wheel disk 10, and the sealing ring 5, as a single part. Insert parts, such as the screws 11, the nuts 12, bushings and sealing gaskets and the like can be molded into the high-resistant plastic material. It is even possible to cut and mold a thread directly into the plastic material. Since the sealing rings can be integrated into the plastic material, the assembly procedure during the production of the oscillating motor can be simplified as well. In this way, the number of sealing gaskets can be reduced to a minimum. Because of the single-part design of parts of the oscillating motor, manufacturing costs can be lowered. This also leads to a lower production effort.

The high-resistant plastic material used has the same temperature expansion as metal, particularly steel, so that during installation of this oscillating motor in the engine compartment of the motor vehicle, no problems occur due to the temperatures prevalent there. The plastic material has the same beneficial stability characteristics as steel. In the areas in which the plastic material contains screws, it exhibits advantageously minimal settling characteristics so that the parts, which are held together with screws, do not loosen during operation and are held together reliably over the duration of use of the oscillation motor. The high-resistant plastic material used is characterized by its high shape and dimensional accuracy. In particular, the angle radii in the area between the stator 6 and the cover elements can be developed with a high shape and dimension accuracy.

Particularly in the area of the toothed belt wheel/sprocket wheel 2, the high-resistant plastic material has a very high wear resistance so that the stress on the timing belts, chains, gearwheels, and metallic friction partners that run across the wheel 2 is very low. In addition to that, the plastic material is oil, diesel, and gas-resistant. The plastic material itself is temperature-resistant and therefore excellently suited for direct use in engines. Not to be neglected is the recycling capability of the plastic material.

Through the use of the high-resistant plastic materials the static, hydraulic, dynamic, tribological, and mechanic characteristics required specifically for the oscillating motors of valve operating control systems can be accomplished. The material that meets these requirements contains approximately between 15% and 30%, preferably approximately 20% resin, approximately between 15% and 30%, preferably 20% glass fibers, and approximately 45% up to approximately 65% mineral compounds, preferably approximately 60% mineral compounds.

Figure 1:
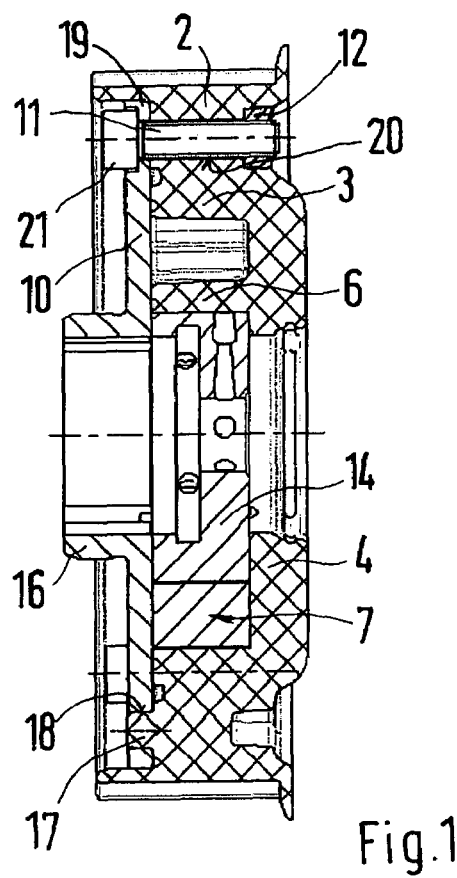
FIG. 1 is an axial sectional view of a first design of a drive according to the invention.
Figure 8:
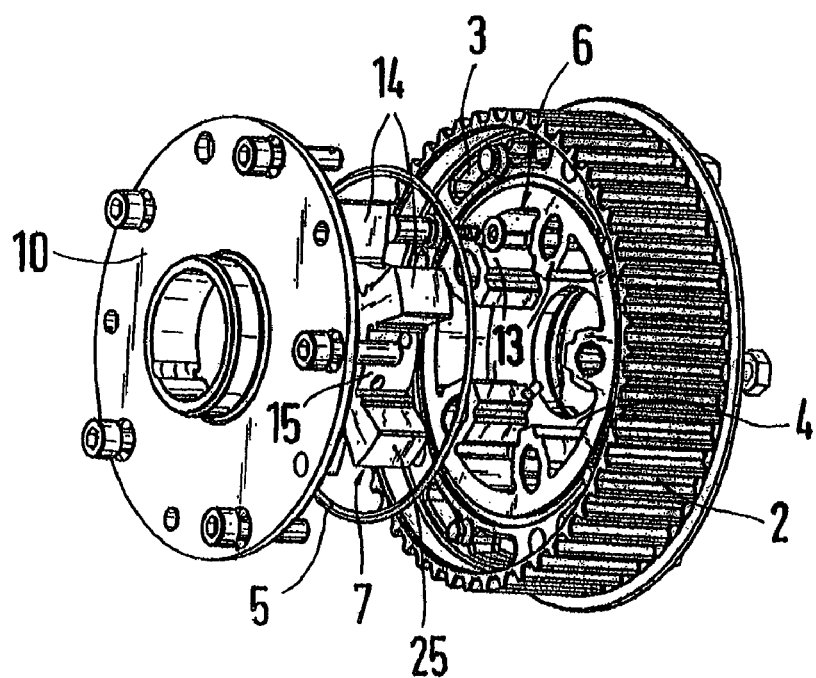
FIG. 8 is an exploded view of the drive according to FIG. 1.

FIG. 1 shows an oscillating motor in assembled condition, which consists of only a few components. It has a toothed belt wheel 2, which is designed as one part with the hood-shaped cover 3 and the stator 6. As for example shown in FIG. 6, the stator 6 comprises blades 13, which are directed inward in the familiar fashion and are evenly distributed across the inner circumference of the stator 6. Between the blades 13 of the stator 6, the blades 14 of the rotor 7 engage in the familiar way (FIG. 8). The blades 14 project radially outward from a circular base body 15. As FIG. 8 shows, the blades 14 are evenly distributed across the circumference of the base body 15. The blades 14 can be supplied with a pressure medium from both sides in the familiar fashion so that the blades 14 can be rotated between the adjacent blades 13 of the stator 6. The rotor 7 consists of a metallic material and rests on the closing ring 4, which is designed as a single part with the stator 6 and therefore the cover 3 and the belt wheel 2. On the opposing side the wheel disk 10 rests against the rotor 14. The wheel disk 10 has an axial protruding bushing-shaped nose 16 in the center. The wheel disk 10 rests also on the cover 3 and the stator 6 and is axially protruded by the belt wheel 2, which is axially protruded in turn by the nose 16.

The cover 3 has protrusions 17 arranged across its circumference, which engage in the appropriate openings 18 close to the outer edge of the wheel disk 10. The wheel disk 10 is additionally equipped with openings 19 for the threaded bolts 11, which protrude through an axial opening 20 in the cover 3 and are screwed into the nuts 12, which are beneficially embedded in the plastic material. The heads 21 of the threaded bolts 11 are recessed in the toothed belt wheel 2.

Since on this oscillating motor the toothed belt wheel 2, the cover 3, the stator 6, and the closing ring 4 are produced as a single part from plastic material, not only costs for their production are saved, but the weight of the oscillating motor and the assembly effort are also noticeably lowered. The wheel disk 10, which can also consist of high-resistant plastic material, contains only in the radial outer section the openings 20 for the passage of the threaded bolts 11.

Figure 2:
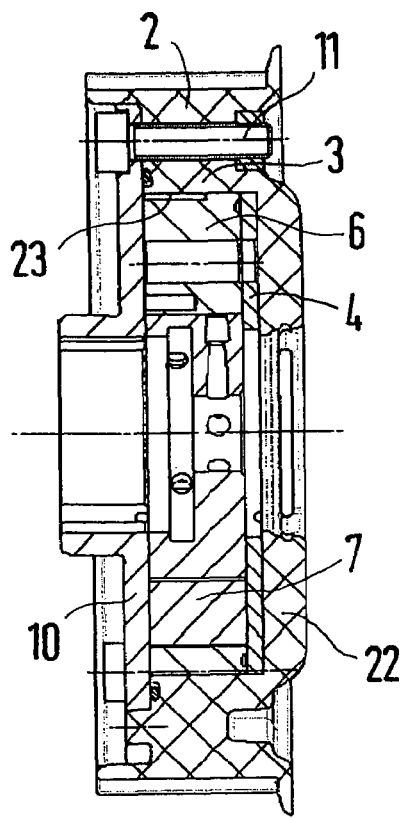
FIG. 2 is an axial sectional view of a second design of a drive according to the invention.

In the design according to FIG. 2, the toothed belt wheel 2 and the hood-shaped cover 3 are produced in a single part from high-resistant plastic material. The stator 6 and the rotor 7 are inserted in the cover 3 as separate components and consist of conventional material. The stator 6 and/or the rotor 7 can certainly consist of high-resistant plastic material as well.

On the bottom 22 of the cover 3 rests the closing ring 4, on which the stator 6 and the rotor 7 rest. According to the previous design, the wheel disk 10 rests on the stator 6 and the rotor 7 on the opposing side. It is mounted with the threaded bolt 11 as described based on the previous design example.

The stator 6 abuts to the cylindrical inner wall 23 of the cover 3, ensuring a flawless radial alignment of the stator 6 in relation to the cover 3.

The base body 15 (FIG. 8) of the motor 7 has a casing surface, which rests on a cylinder jacket, from which the blades 14 project radially outward. The front sides 24 (FIG. 3) of the blades 13 of the stator 6 rests on a cylinder jacket intended for this purpose. The base body 15 of the rotor 7 abuts plane to these front sides 24.

In its remainder the oscillating motor according to FIG. 2 is designed in the same way as the design according to FIG. 1.

Figure 3:
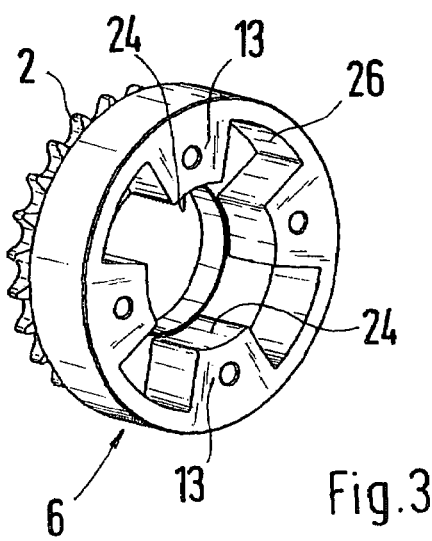
FIG. 3 is a diagrammatic view of a sprocket wheel and a stator, both together designed as a single part, of the invented drive.

FIG. 3 shows the stator 6, produced in a single part with the sprocket wheel 2 from high-resistant plastic material. The stator 6 is designed in the same way as in the previous designs and comprises radially inward protruding blades 13 with the front sides 24 resting on an intended cylinder jacket. The stator 6 with the sprocket wheel 2 is, as described in FIGS. 1 and 2, inserted into the hood-shaped cover 3 and is attached with the help of the cover disc 10, the threaded bolts 11, and the nuts 12. The rotor 7 is located in the stator 6, wherein its blades 14 protrude into the area between the adjacent blades 13 of the stator 6. The front sides 25 (FIG. 8) of the blades 14 of the rotor 7 rest on an intended cylinder jacket, whose diameter corresponds to the inner diameter of the stator 6. Thereby the blades 14 of the rotor 7 with its front sides 25 abut plane to the cylindrical inner wall 26 of the stator 6, from which the blades 13 protrude radially inward.

FIGS. 4 and 5 show a design in which the toothed belt wheel 2, the hood-shaped cover 3, the closing ring 4, and the stator 6 are again produced in a single part from high-resistant plastic material. In addition, in the front side 27, on which the wheel disk 10 rests when the oscillating motor is assembled, a sealing ring 28, which consists of a suitable sealant material, is integrated. This sealing ring 28 is inserted into the injection mold during production for the production of the part according to FIG. 4 so that the sealing ring 28 does not have to be inserted at a later time. This eliminates one assembly operation. Furthermore, the sealing ring 28 is held optimally in the plastic material, and therefore the danger of it being unintentionally loosened by the stator 6 does not exist. The sealing ring 28 protrudes over the front side 27 of the stator 6 so that when the wheel disk 10 is put on and mounted with the threaded bolt 11, the sealing ring 28 is sufficiently deformed and proper sealing is guaranteed.

The rotor 7 is inserted into the stator 6, as shown in FIGS. 1 and 2. In its remainder this design corresponds to the example according to FIG. 1.

FIG. 6 shows the component according to FIG. 4 with the toothed belt wheel 2, the closing ring 4, the stator 6, and the hood-shaped cover 3. Since these functional elements of the oscillating motor are combined into one part, simple and particularly cost-saving assembly of the oscillating motor is guaranteed.

Figure 7:
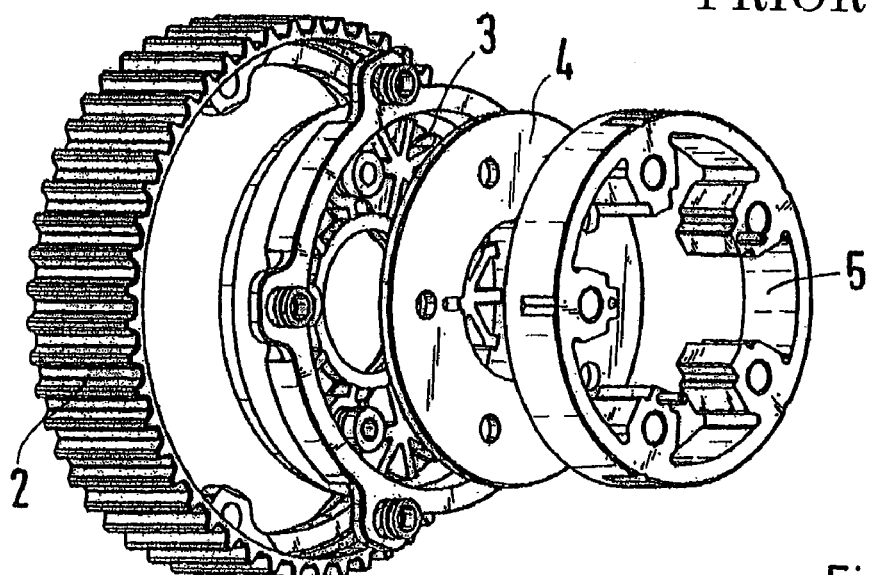
FIG. 7 is an exploded view of a toothed belt wheel, a cover, a closing ring, and a stator of a familiar drive.

FIG. 7 shows the conventional design, in which four parts are necessary for the functional elements pursuant to FIG. 6, such as the toothed belt wheel 2, the cover 3, the closing ring 4, and the stator 5. Therefore, on this well-known oscillating motor, four parts are provided, which each have to be manufactured independently and then be put together. Thereby the manufacture and assembly of an oscillating motor with these parts is elaborate and costly. A comparison with FIG. 6 shows how simple it would be if the toothed belt wheel 2, the cover 3, the stator 6, and the closing ring 4 are designed as a single part.

FIG. 8 shows the complete oscillating motor with the wheel disk 10, the sealing ring 5, the rotor 7, as well as the single part component consisting of the toothed belt wheel 2, cover 3, stator 6, and the closing ring 4. For this oscillating motor therefore only a total of four parts are necessary, whereas the conventional oscillating motor, as FIG. 9 shows, needs eleven components. It is obvious that the production and the assembly of this known oscillating motor is extremely elaborate and costly. In the oscillating motor according to FIG. 8 only four parts need to be assembled, which results in a very simple and cost-efficient manufacture and assembly.

Figure 10:
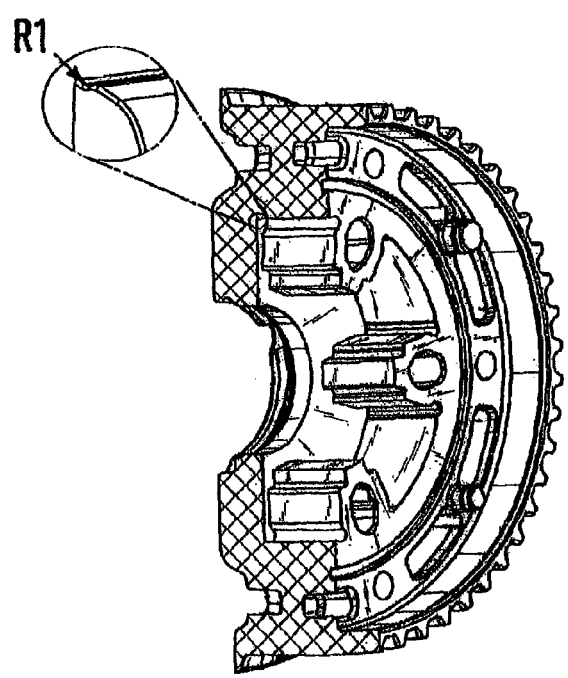
FIG. 10 is a diagrammatic view of one part of the invented drive.

As a result of the use of the high-resistant plastic material, the parts of the oscillating motor can be produced with high shape and dimensional accuracy. Thus FIG. 10 shows for example that the angle radius R1 can be produced in a simple way with high shape and dimensional accuracy. The angle radius provided in FIG. 10 is only shown as an example. Other angle radii are provided in further areas of this component. However, other dimensions and/or shapes of this single part component can also be produced with high shape and dimensional accuracy.

Figure 11:
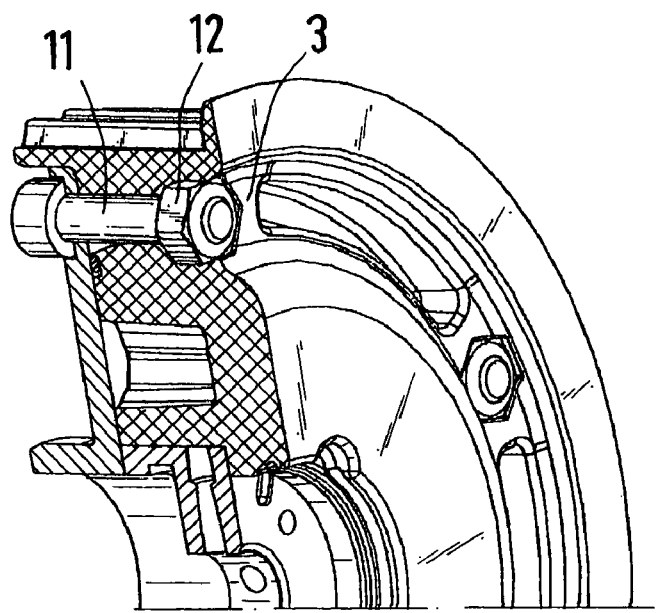
FIG. 11 is a diagrammatic view of the arrangement of a threaded bolt in the invented drive.
Figure 12:
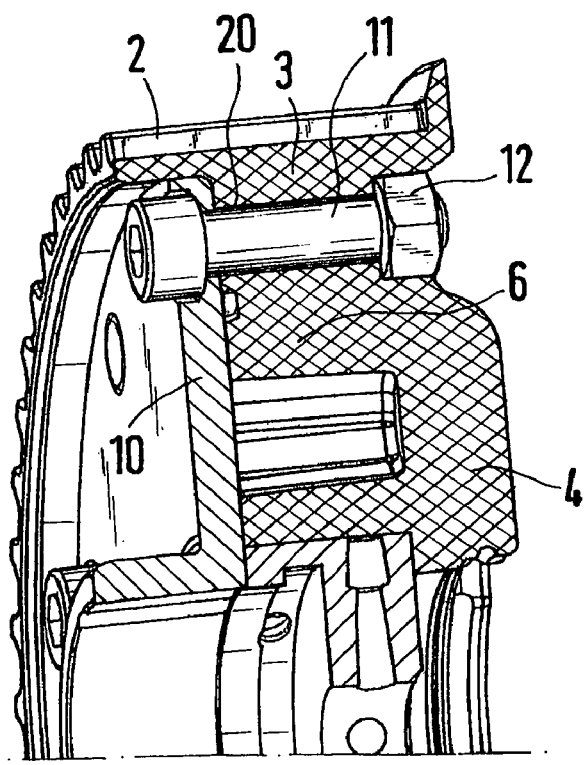
FIG. 12 shows the threaded bolt according to FIG. 11 in a different view.

FIG. 11 shows the nut 12, which is molded into the cover 3. Therefore, the threaded bolt 11 then only has to be screwed into the nut 12, which is already in the cover 3. This guarantees that the nuts 12 are definitely available when the individual parts are assembled into the oscillating motor.

It is also possible to design the opening 20 in the cover 3 as a threaded hole in place of the molded nut 12. In this case the nut 12 is not needed for the threaded bolt 11. This thread can be provided directly during the molding process of this plastic part. However, it is also possible to add the threaded hole 20 in the cover 3 at a later time.

The invention claimed is:

1. A drive for valve drive operating control systems in motor vehicles, comprising:
   at least one drive wheel,
   functional parts, wherein the functional parts include a cover, a stator, and a closing ring, and
   at least one rotor made of a metallic material,
   wherein the drive wheel and the cover, the stator, and the closing ring are produced in a single part from a high-resistant plastic material, wherein the high-resistant plastic material has a same temperature expansion as steel, and
   wherein the high-resistant plastic material is from approximately 45% up to approximately 65% mineral compounds, approximately 20% resin, and approximately 20% glass fibers.

2. The drive according to claim 1, wherein a sealing ring is integrated into the cover.

3. The drive according to claim 2, wherein the sealing ring is partially molded by the material forming the cover.

4. The drive according to claim 1, wherein the at least one rotor is secured in its position between the closing ring and a cover disk.

5. The drive according to claim 4, wherein the cover disk is held in place by a threaded bolt.

6. The drive according to claim 5, wherein the threaded bolt is one of plural threaded bolts, and wherein nuts allocated to the threaded bolts are molded into the cover.

7. The drive according to claim 5, wherein the threaded bolt is one of plural threaded bolts, and wherein the threaded bolts are screwed into threaded openings in the cover.

8. The drive according to claim 4, wherein the cover disk consists of metallic material.

9. The drive according to claim 4, wherein the cover disk consists of high resistant, non-metallic material.

10. The drive according to claim 9, wherein the high-resistant, non-metallic material contains duroplastic.

11. The drive according to claim 10, wherein the duroplastic is a resin.

12. The drive according to claim 11, wherein the resin is between about 15% and 30% of the non-metallic material.

13. The drive according to claim 10, wherein the duroplastic is between about 15% and 30% of the non-metallic material.

14. The drive according to claim 13, wherein the duroplastic is about 20% of the non-metallic material.

15. The drive according to claim 9, wherein the high-resistant material contains between about 15% and 30% filling agents.

16. The drive according to claim 15, wherein the high resistant material contains about 20% filling agents.

17. The drive according to claim 15, wherein filling agents are glass fibers.

18. The drive according to claim 1, wherein the drive wheel is a belt wheel.

19. The drive according to claim 18, wherein the belt wheel is a toothed belt wheel.

20. The drive according to claim 1, wherein the drive wheel is a sprocket wheel.

21. The drive according to claim 1, wherein the high-resistant plastic material contains about 60% mineral compounds.

* * * * *